Patented Sept. 16, 1947

2,427,532

UNITED STATES PATENT OFFICE 2,427,532

RUBBER LATEX EXTENDED WITH AN AQUEOUS EMULSION OF A CRACKED GASOLINE DISTILLATE POLYMER RESIN

John J. Miskel, Brooklyn, N. Y., assignor to Nopco Chemical Company, Harrison, N. J., a corporation of New Jersey No Drawing. Application September 13, 1943, Serial No. 502,197

3 Claims. (Cl. 260—8)

This invention relates to emulsions of cracked petroleum distillate polymer resins and, in some of its more particular aspects, to the use of such emulsions to extend natural and artificial rubber latices.

It has been discovered by this invention that resins produced by the catalytic polymerization of cracked gasoline distillates may be emulsified in water and when so emulsified provide highly effective adhesive, indurating, waterproofing and like agents. The emulsions are further useful in admixture with natural and artificial rubber latices as extenders, mixtures of such latices with the emulsions of this invention retaining the desirable properties of the undiluted latices in a large measure, even when the resin emulsion is incorporated in relatively preponderant proportion. The resins employed in the emulsions of this invention are cheaply and readily procurable from reliable domestic sources. The emulsions produced in accordance with this invention are stable over long periods of time and even under relatively adverse conditions of storage and shipment.

Resins emulsified in accordance with this invention are in general those resins produced by the catalytic polymerization of unsaturated petroleum distillates produced in the course of the cracking process as applied to gasoline in the vapor phase. These distillates contain relatively large proportions of unsaturates which, when contacted with condensing agents such as porous silicate masses on the order of fuller's earth, activated clay, synthetic zeolites, etc., or with aluminum chloride, sulfuric acid and the like, polymerize to produce thermoplastic resins of relatively high melting point. The process of producing these resins forms no part of the present invention, typical processes for this purpose being disclosed in United States Patents Nos. 1,919,722, 2,116,499, and 2,137,492 and also in Industrial and Engineering Chemistry, volume 24, page 1125.

The preparation of emulsions of cracked petroleum resins according to this invention may be readily carried out by stirring together the selected resin and water containing an emulsifying agent, the comingling of these ingredients taking place in either order but, preferably, the resin being stirred into the aqueous emulsifier solution. An emulsion of the resin as the disperse phase in the aqueous phase results, which may be used as such as may be further refined by passage through a colloid mill or a homogenizer. Many of the resins adapted to be employed in this invention are of relatively high melting point and, accordingly, must be softened to accomplish the dispersion as just discussed. This may be effected by carrying out the step of emulsifying at relatively high temperatures or, alternatively, solvents or plasticizers may be mixed into the resins prior to their emulsification in aqueous medium.

As mentioned above, it may be desirable to incorporate various softening agents into the resins emulsified in accordance with this invention in order to render the same amenable to the emulsification process. This may be effected by adding to the resin before emulsifying same, a sufficient quantity of one or more solvents such as petroleum distillates, naphtha, benzene, toluene and the like, or of plasticizers such as rosin oil, mineral oil, methyl abietate, diethylene glycol abietate, coal-tar heavy distillate, dimethyl naphthalene, drying and non-drying oils, glyceryl pthalate resins and the like, to soften the resin to the necessary degree. Particularly, the use of rosin oil results in a highly desirable permanent tack and flexibility in adhesive films deposited from emulsions containing resins softened with this material.

Any of the usual emulsifying agents may be employed in solution in water to effect the emulsification of resins in accordance with this invention. Casein has been found to provide a cheap and satisfactory emulsifying action, being incorporated in the aqueous emulsion in quantities from about 1% to about 6%, based on the amount of water present. If casein is used, it must, of course, be rendered soluble in the aqueous medium by conversion to the acid or alkali salt and heating at temperatures upwards of 50° C. for a time sufficient to effect solution, this manipulation being well understood to those in the art. Instead of or in addition to casein, there may, of course, be employed one or more emulsifying agents such as fatty and naphthenic alkali, ammonium and amine soaps; fatty sulfates; sulfonated fatty oils and fatty acids; fatty amides; cellulose ethers; pectins; lecithin; gelatin; egg and plant proteins, and the like.

The emulsions of this invention may carry relatively large amounts of resin, percentages as high as 60 per cent being readily attainable. In general, the practical range of resin content will vary between about 15 per cent and about 70 per cent, based on the total emulsion composition.

Emulsions of this invention may be used in a wide variety of applications, for instance, as adhesives for fabrics, leather, paper, felt and the like. The emulsions may also be used to deposit pressure-adhesive coatings as in the manufacture of friction and masking tapes. The compositions may also enter into can-sealing compositions, into compositions for indurating paper to form artificial leathers, into carpet-backing compositions, etc. The compositions may further be used in flock felting, in rock wool compositions, and in automobile sound-deadening compositions. Likewise, the compositions are compatible with natural and artificial rubber latices and serve as highly satisfactory extenders therefor, latices extended with as much as 300 per cent of the emulsions of this invention retaining in large measure the desirable properties of the undiluted latices.

With the foregoing discussion in mind, there are given hereinafter, detailed formal examples for the practice of this invention. All parts given are by weight.

*Example I*

| | Parts |
|---|---|
| Casein | 5.0 |
| Ammonia (28% aqueous) | 0.4 |
| Cracked gasoline distillate polymer | 37.2 |
| Rosin oil | 1.0 |
| V. M. and P. naphtha | 6.0 |
| Ethyl mercury phosphate (preservative) | 0.2 |
| Water | 50.1 |
| Antioxidant | 0.1 |
| | 100.0 |

The cracked gasoline resin, rosin oil and naphtha were warmed together to effect solution. Thereafter, the casein, ammonia and water were mixed together and heated to 70° C. to effect a smooth solution of the casein. The resin solution was then poured slowly with vigorous stirring into the aqueous casein solution, and there resulted a smooth emulsion in which the resin was dispersed as the discontinuous phase in a continuous aqueous phase. The preservative and antioxidant were then added. This emulsion was stable after protracted storage under unfavorable conditions, and in thin films exhibited the bluish color characteristic of highly dispersed emulsions. This emulsion was found suitable as an adhesive for fabrics, natural and artificial leather, and the like.

*Example II*

| | Parts |
|---|---|
| Casein | 5.1 |
| Ammonia (28% aqueous) | 0.5 |
| Borax | 0.1 |
| Cracked gasoline distillate polymer resin | 37.0 |
| Rosin oil | 1.0 |
| V. M. and P. naphtha | 6.0 |
| Ethyl mercury phosphate | 0.2 |
| Antioxidant | 0.1 |
| Water | 50.0 |
| | 100.0 |

The cracked gasoline resin, rosin oil and naphtha were blended together to form a solution. Thereafter, the casein, ammonia, borax, ethyl mercury phosphate, antioxidant and water were mixed and heated to 70° C. to effect a smooth solution. The resin solution was then gradually poured with vigorous stirring into the aqueous casein solution, resulting in an emulsion having the same desirable properties characterizing the emulsion of Example I.

*Example III*

| | Parts |
|---|---|
| Casein | 5.2 |
| Cracked gasoline distillate polymer resin | 27.0 |
| Rosin oil | 27.0 |
| Ammonia | 0.5 |
| Borax | 0.1 |
| Ethyl mercury phosphate (preservative) | 0.2 |
| Water | 40.0 |
| | 100.0 |

The resin and rosin oil were warmed together to effect a homogeneous blend. Thereafter, the casein, ammonia, borax, and water were heated together at 70° C. to form a casein solution into which the resin-rosin oil blend was gradually introduced with vigorous stirring. The preservative was then added. The resultant material was admirably adapted as an adhesive for use on textiles, paper, leather, etc. and possessed a desirable permanent tack.

*Example IV*

| | Parts |
|---|---|
| Resin emulsion of Example I | 75 |
| Latex (ammonia stabilized) | 25 |
| | 100 |

The above ingredients were blended together, yielding an emulsion which possessed adhesive, film-forming and tack properties substantially equal to those of the unmodified latex.

*Example V*

| | Parts |
|---|---|
| Casein | 5.0 |
| Ammonia (28% aqueous) | 0.5 |
| Cracked gasoline distillate resin | 40.0 |
| Xylene | 10.0 |
| Water | 44.5 |
| | 100.0 |

The casein, ammonia and water were heated together at 60° C. to effect a smooth solution of the casein. The resin and xylene were dissolved together, and the resultant solution introduced, with vigorous stirring, into the casein solution. The resultant emulsion was passed through a colloid mill, resulting in a stable emulsified product having the same desirable properties characteristic of the products of the preceding examples.

*Example VI*

| | Parts |
|---|---|
| Cracked gasoline distillate polymer | 17.1 |
| Rosin oil | 5.5 |
| V. M. & P. naphtha | 1.4 |
| Ammonia (28% aqueuos) | 2.0 |
| Borax | .6 |
| Mercury ethyl phosphate (preservative) | .2 |
| Soya bean protein | 12.0 |
| Degraded coconut oil glycerides | 2.0 |
| Water | 59.0 |
| Antioxidant | .2 |
| | 100.0 |

The resin, rosin oil and naphtha were warmed together to effect solution. Thereafter the remaining ingredients were mixed together and heated to 75° C. with stirring until a smooth auqeous dispersion resulted. The blend of resin, rosin oil and naphtha was gradually introduced into this mass with vigorous stirring, resulting in a smooth and stable emulsion. This emulsion was found to be highly satisfactory as a size and binder in making paper makers' felts.

From the foregoing general discussion and detailed formal examples, it is apparent that there are provided by this invention novel emulsions which are produced from cheaply and readily procurable cracked gasoline distillate resins, and which are useful and effective adhesive and indurating agents in the textile, paper, leather, etc. industries. Likewise, the emulsions are capable of greatly extending natural and artificial rubber latices without substantially changing the properties thereof.

What is believed to be novel and is desired to be secured by Letters Patent is:

1. A composition of matter which comprises 1 part by weight of rubber latex extended with a substantial quantity, but not in excess of 3 parts by weight, of an aqueous emulsion containing 15 to 70 per cent by weight of a cracked gasoline distillate polymer resin; said composition having in a large measure the adhesive, film-forming and tack properties of the unmodified latex.

2. A composition according to claim 1 in which said aqueous emulsion is stabilized with solubilized casein.

3. A composition according to claim 1 in which said aqueous resin emulsion is stabilized with an ammonium caseinate and contains rosin oil blended with the resin.

JOHN J. MISKEL.

REFERENCES CITED

The following references are of record in the file of this patent:

UNITED STATES PATENTS

| Number | Name | Date |
| --- | --- | --- |
| 1,919,722 | Hyman | July 25, 1933 |
| 2,116,499 | Hyman | May 10, 1938 |
| 2,137,492 | Hyman | Nov. 22, 1938 |
| 1,948,442 | Ellis | Feb. 20, 1934 |